United States Patent
Hsiao et al.

(10) Patent No.: US 9,389,359 B2
(45) Date of Patent: Jul. 12, 2016

(54) BACKLIGHT MODULE OF CURVED LIQUID CRYSTAL DISPLAY DEVICE AND CURVED LIQUID CRYSTAL DISPLAY DEVICE

(71) Applicant: Shenzhen China Star Optoelectronics Technology Co., Ltd., Shenzhen, Guangdong (CN)

(72) Inventors: Yuchun Hsiao, Guangdong (CN); Gang Yu, Guangdong (CN); Jiaxin Li, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 137 days.

(21) Appl. No.: 14/235,381

(22) PCT Filed: Dec. 19, 2013

(86) PCT No.: PCT/CN2013/089990
§ 371 (c)(1),
(2) Date: Jan. 27, 2014

(87) PCT Pub. No.: WO2015/085621
PCT Pub. Date: Jun. 18, 2015

(65) Prior Publication Data
US 2015/0160407 A1 Jun. 11, 2015

(30) Foreign Application Priority Data
Dec. 11, 2013 (CN) .......................... 2013 1 0676380

(51) Int. Cl.
*G02F 1/1335* (2006.01)
*F21V 8/00* (2006.01)
*G02F 1/1333* (2006.01)

(52) U.S. Cl.
CPC .............. *G02B 6/0088* (2013.01); *G02B 6/009* (2013.01); *G02B 6/0081* (2013.01); *G02F 1/1336* (2013.01); *G02F 1/133308* (2013.01); *G02F 2001/133314* (2013.01)

(58) Field of Classification Search
CPC ..... G02B 6/0088; G02B 6/009; G02F 1/1336
USPC .......................................................... 349/58
See application file for complete search history.

(56) References Cited

U.S. PATENT DOCUMENTS

| | | | | |
|---|---|---|---|---|
| 2007/0146569 A1* | 6/2007 | Nouchi | ................ | G02B 6/0088 349/58 |
| 2008/0173774 A1* | 7/2008 | Saez | ...................... | F16M 11/04 248/124.1 |
| 2008/0297683 A1* | 12/2008 | Murata | ............. | G02F 1/133604 349/58 |
| 2009/0322989 A1* | 12/2009 | Kim | .................. | G02F 1/133308 349/65 |

(Continued)

Primary Examiner — Sang V Nguyen
(74) Attorney, Agent, or Firm — Andrew C. Cheng

(57) ABSTRACT

The present invention provides a backlight module of a curved liquid crystal display device, which includes a light-guiding plate, having an upper curved surface, a lower curved surface, a first side surface and a second side surface, wherein the upper curved surface and the lower curved surface being connected to the first side surface and the second side surface at both ends respectively; a first light source unit, fixedly disposed near the first side surface, a back frame, having a back plate comprising a plurality of steps, wherein the step surface of the steps contacting to support the lower curved surface. The present invention simplifies the back frame structure and reduces manufacturing cost. The present invention also discloses a curved liquid crystal display device with the above backlight module.

16 Claims, 2 Drawing Sheets

(56) References Cited

U.S. PATENT DOCUMENTS

| | | | |
|---|---|---|---|
| 2010/0073620 A1* | 3/2010 | Yamaguchi | G02F 1/133305 349/160 |
| 2011/0096262 A1* | 4/2011 | Kikuchi | G06F 9/301 349/58 |
| 2012/0032201 A1* | 2/2012 | Chou et al. | 257/88 |
| 2012/0032220 A1* | 2/2012 | Cannon | H01L 33/507 257/98 |
| 2012/0281367 A1* | 11/2012 | He | H05K 5/02 361/728 |
| 2013/0321740 A1* | 12/2013 | An | H05K 5/0217 349/58 |
| 2014/0111732 A1* | 4/2014 | Yu | G02F 1/133504 349/58 |
| 2015/0146111 A1* | 5/2015 | Gotou | G02F 1/1333 348/791 |

* cited by examiner

BACKLIGHT MODULE OF CURVED LIQUID CRYSTAL DISPLAY DEVICE AND CURVED LIQUID CRYSTAL DISPLAY DEVICE

BACKGROUND OF THE INVENTION

1. Field of the Invention

The present invention relates to the field of liquid crystal displaying techniques, and in particular to a backlight module of curved liquid crystal display device and curved liquid crystal display device.

2. The Related Arts

As the flat screen TV grows larger in size, the distance between the pixels in the central area of the screen and the pixels in the peripheral area also grows larger, which causes both image and color distortions near the edges of the screen. One of the possible solutions is to curve the screen because a curved screen provides better viewing effect than a known flat screen TV. For example, in an IMAX movie theater, a viewing experience similar to that sitting in the central area can be obtained regardless of the seat anywhere. This is because of the curved screen used in IMAX. By curving the screen towards surrounding viewers, the specifically calculated curvature of the screen can ensure the distance of every pixel of the screen to viewers is equal so as to reduce the distortion as well as provide larger viewing angle and wide full screen viewing experience. As such, viewing TV in a living room can be as enjoyable as viewing in an IMAX theater.

FIG. 1 is a schematic view showing the structure of a known curved liquid crystal display device. As shown in FIG. 1, the curved liquid crystal display device of known technique comprises a curved backlight module 110 and a curved open cell 120 disposed opposite to the curved backlight module 110; wherein the an outer frame 130 and a mold frame 111 are used to fasten the curved backlight module 110 and the curved open cell 120. Because a large curved sheet metal is difficult to manufacture, in order to form a curved backlight module 110, the common approach is to manufacture a curved steel frame 113, and then use a locking element 114 to lock the curved steel frame 113 to a flat back frame 112 to force the back frame to bend to form curved backlight module 110. However, this approach complicates the structure of the back frame and increases the manufacturing cost.

SUMMARY OF THE INVENTION

The technical issue to be addressed by the present invention is to provide a backlight module of curved liquid crystal display device, which comprises: a light-guiding plate, having an upper curved surface, a lower curved surface, a first side surface and a second side surface, wherein the upper curved surface and the lower curved surface being connected to the first side surface and the second side surface at both ends respectively; a first light source unit, fixedly disposed near the first side surface, a back frame, having a back plate comprising a plurality of steps, wherein the step surface of the steps contacting to support the lower curved surface.

According to a preferred embodiment of the present invention, the backlight module further comprises a second light source unit, fixedly disposed near the second side surface.

According to a preferred embodiment of the present invention, the surface of the step has a curvature the same as or similar to the curvature of the lower curved surface.

According to a preferred embodiment of the present invention, the surface of each of the plurality of steps is parallel to each other.

According to a preferred embodiment of the present invention, the back plate further comprises a flat plate, wherein the plurality of steps is disposed symmetrically on the two side ends of the flat plate.

According to a preferred embodiment of the present invention, the back frame further comprises a first side wall and a second side wall, wherein the first side wall and the second side wall are disposed at the two side ends of the back plate respectively, and the first side wall is parallel to the first side surface and the second side wall is parallel to the second side surface.

According to a preferred embodiment of the present invention, the first light source unit is fixedly disposed on the first side wall so that the first light source unit faces directly the first side surface; the second light source unit is fixedly disposed on the second side wall so that the second light source unit faces directly the second side surface.

According to a preferred embodiment of the present invention, the first light source unit and the second light source unit both comprise at least a light-emitting diode (LED).

According to a preferred embodiment of the present invention, the backlight module further comprises: a middle frame, disposed on top of the upper curved surface and being fixedly engaged to the first side wall and the second side wall so as to fix the light-guiding plate, the first light source unit and/or the second light source unit inside the back frame.

The present invention provides a curved liquid crystal display device, which comprises: a backlight module and a liquid crystal panel disposed opposite to the backlight module; the backlight module providing lighting to the liquid crystal panel so that the liquid crystal panel can display image, wherein the backlight module is the above-mentioned backlight module.

The efficacy of the present invention is that to be distinguished from the state of the art. The curved liquid crystal display device, compared to the known technique, saves the steel frame to force the back frame to curve. Through disposing curved steps on the back frame with curvature fitting the curvature of the curved liquid crystal display device to support the other components of the curved liquid crystal display device, the present invention simplifies the structure of the back frame as well as reduces manufacturing cost.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

The following refers to the drawings and the embodiment to describe the present invention in details. However, the present invention is not limited to the disclosed embodiments.

Figure 1:
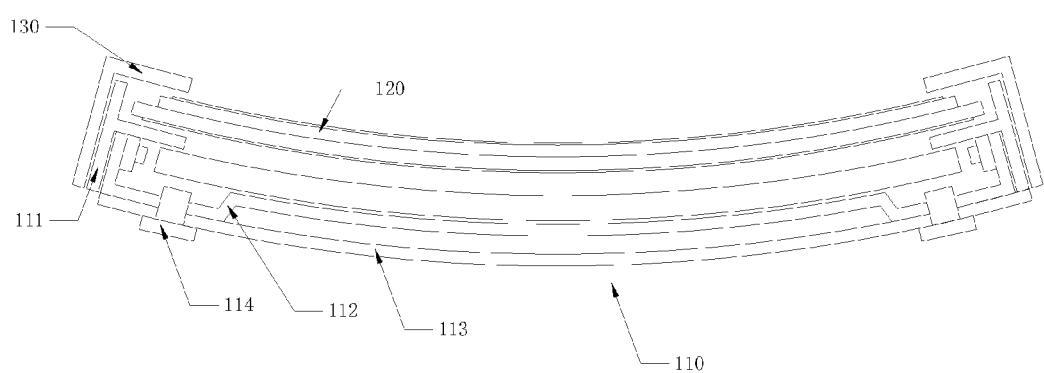
FIG. 1 is a schematic view showing the structure of a known curved liquid crystal display device.
Figure 2:
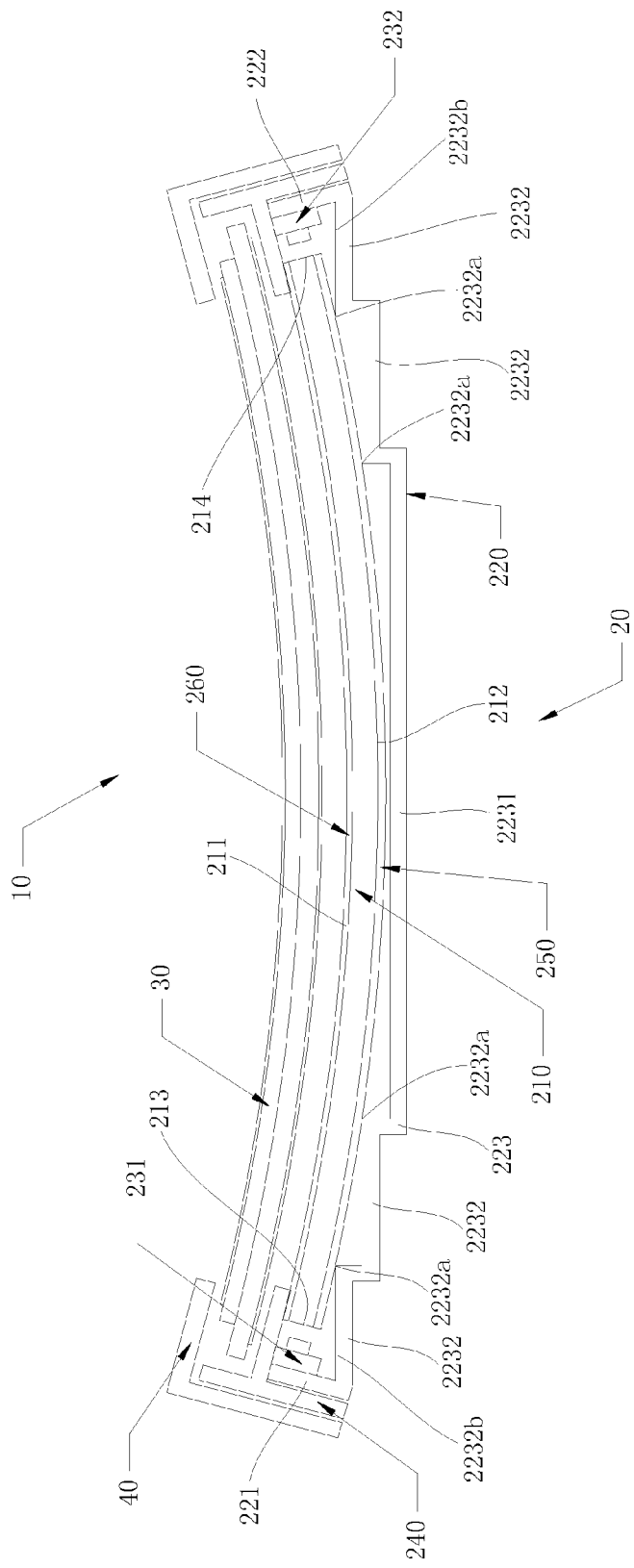
FIG. 2 is a schematic view showing the structure of an embodiment of a curved liquid crystal display device according to the present invention.

FIG. 2 is a schematic view showing the structure of an embodiment of a curved liquid crystal display device according to the present invention.

Referring to FIG. 2, a curved liquid crystal display device 10 according to an embodiment of the present invention comprises a backlight module 20, a liquid crystal panel 30 and an outer frame 40; wherein the outer frame 40 fixes the liquid crystal panel 30 to the backlight module 20 by fixedly engaging the backlight module 20. The backlight module provides lighting to the liquid crystal panel 30 so that the liquid crystal panel 30 can display images. In the instant embodiment, the curved liquid crystal display device 10 has a curved appearance. The curvature in Figure is only for illustrative purpose, instead of restrictive.

Because the liquid crystal panel 30 of the instant embodiment has the same structure as the known liquid crystal panel, only simple description will be provided here. The liquid crystal panel 30 has a curvature roughly similar to the curvature of the curved liquid crystal display device 10, and mainly comprises a color filter (CF) substrate, a thin-film transistor (TFT) array substrate and a liquid crystal layer sandwiched between the CF substrate and the TFT array substrate; wherein the liquid crystal layer comprise a plurality of liquid crystal molecules. The CF substrate usually comprises a transparent substrate (such as, glass substrate), and a black matrix, color photo-resistant layers (such as, R, G, B) and alignment layer disposed on the transparent substrate. The TFT substrate usually comprises a transparent substrate (such as, glass substrate), and a plurality of TFTs arranged in an array format on the transparent substrate. The TFT array substrate is for providing driving voltage to the liquid crystal molecules of the liquid crystal layer so that the liquid crystal molecules can tilt to allow the light pass through the liquid crystal layer to cooperate with the CF substrate to enable the liquid crystal panel 30 to display images.

The following describes the backlight module 20 of the present embodiment in details.

The backlight module 20 of the present embodiment has a curvature roughly similar to the curved liquid crystal display device 10, and mainly comprises a light-guiding plate 210, a back frame 220, a first light source unit 231, a second light source unit 232, a middle frame 240, a reflector 250 and an optical film 260.

The light-guiding plate 210 comprises an upper curved surface 211, a lower curved surface 212, a first side surface 213 and a second side surface 214, wherein the upper curved surface 211 and the lower curved surface 212 are connected to the first side surface 213 and the second side surface 214 at both ends respectively to form a curved light-guiding plate with a curvature the same as or similar to the curvature of the liquid crystal display device 10.

The back frame 220 comprises two opposite side walls and a back plate 223, wherein the two opposite side walls are the first side wall 221 and the second side wall 222. The back plate 223 comprises a flat plate 2231 and four steps 2232, wherein each step has a step surface 2232a. The number of the steps shown in FIG. 2 is only for illustrative purpose, instead of restrictive. Preferably, the four steps are evenly disposed at the two side ends of the flat plate 2231. In other words, two steps 2232 are disposed at the left side end of the flat plate 2231 and the other two steps 2232 are disposed at the right side end of the flat plate 2231. In the present invention, each step 2232 can be randomly disposed at any side end of the flat plate 2231 as long as each side end of the flat plate 2231 is disposed with at least a step 2232. The two side walls of the back frame 220 are disposed at the two side ends of the back plate 223. In the instant embodiment, the first side wall 221 is disposed at the left side end of the back plate 223, and the second side wall 222 is disposed at the right side end of the back plate 223. In other words, the first side wall 221 is connected to the step 2232 farthest away from the left side end of the flat plate 2231, and the second side wall 222 is connected to the step 2232 farthest away from the right side end of the flat plate 2231.

The two side walls (i.e., the first side wall 221 and the second side wall 222) of the back frame 220 and the back plate 223 form a housing space (not shown). The light-guiding plate 210 is disposed inside the housing space so that the step surface 2232a of each step contacts to support the lower curved surface 212 of the light-guiding plate 210. As such, the step surface 2232a of each step 2232 has a curvature the same as or similar to the curvature of the liquid crystal display device 10. During manufacturing, the back frame 220 can be manufactured monolithically. For convenience in design, the step surface 2232 of each step 2232 is preferably parallel to each other, but is not limited to.

Furthermore, the angle between the first side wall 221 of the back frame 220 and the step surface 2232a of the step 2232 farthest away from the left side end of the flat plate 2231 connected to the first side wall 221 must ensure the first side wall 221 of the back frame 220 is parallel to the first side surface 223 of the light-guiding plate 210; and the angle between the second side wall 222 of the back frame 220 and the step surface 2232a of the step 2232 farthest away from the right side end of the flat plate 2231 connected to the second side wall 222 must ensure the second side wall 222 of the back frame 220 is parallel to the second side surface 224 of the light-guiding plate 210.

The first light source unit 231 and the second light source unit 232 are fixedly disposed on the first side wall 221 and the second side wall 222 respectively so that the first light source unit 231 and the second light source unit 232 are respectively near the first side surface 223 and the second side surface 224 of the light-guiding plate 210. As aforementioned, because the first side wall 221 of the back frame 220 is parallel to the first side surface 223 of the light-guiding plate 210 and the second side wall 222 of the back frame 220 is parallel to the second side surface 224 of the light-guiding plate 210, the first light source unit 231 and the second light source unit 232 directly face the first side surface 223 and the second side surface 224 of the light-guiding plate 210. As such, the light from the first light source unit 231 and the second light source unit 232 can emit directly from the light-guiding plate 210 to the first side surface 223 and the second side surface 224. The number of light source unit in FIG. 2 is only for illustrative purpose, instead of restrictive. For example, the backlight module in another embodiment, one light source unit is fixedly disposed to the first side wall 221 or the second side wall 222 of the back frame 220 so that the light source is near and faces directly to the first side surface 223 or the second side surface 224 of the light-guiding plate 210. In addition, in the instant embodiment, the first light source unit 231 and the second light source unit 232 both comprises power-supplying printed circuit board (PCB) and the light-emitting diode (LED) electrically connected to the PCB. However, the embodiment is not restrictive. For example, the first light source unit 231 and the second light source unit 232 can also use cold cathode fluorescent lamp (CCFL).

The middle frame 240 can be made of plastic, disposed on the upper curved surface 211 of the light-guiding plate 210, and fixedly engaged to the first side wall 221 and the second side wall 222 of the back frame 220 so as to fix the light-guiding plate 210, the first light source unit 231 and the second light source unit 232 disposed inside the housing space formed by the back frame 220 and two side walls (i.e., the first side wall 221 and the second side wall 222).

Furthermore, in the instant embodiment of the present invention, the liquid crystal panel 30 of the curved liquid crystal display device 10 is disposed on top of the backlight module 20, and is neighboring the upper curved surface 211 of the light-guiding plate 210. The outer frame 40 of the curved liquid crystal display device 10 fixedly engages the liquid crystal panel 30 to the backlight module 20 by fixedly engagement to the middle frame 240. The reflector 250 is disposed between the lower curved surface 212 of the light-guiding plate 210 and the back frame 220 for reflecting the light emitted from the lower curved surface 212 of the light-guiding plate 210 back to the light-guiding plate 210 to increase the light utilization efficiency. The optical film 260 is disposed between the upper curved surface 211 of the light-guiding plate 210 and the liquid crystal panel 30 for improving the luminance, color saturation and color uniformity of the light emitted from the curved upper surface 211 of the light-guiding plate 210 so as to improve the displaying effect of the liquid crystal panel 30. This part is similar to the known technique, and the detailed description will be omitted.

In summary, the efficacy of the present invention is that to be distinguished from the state of the art. The curved liquid crystal display device, compared to the known technique, saves the steel frame to force the back frame to curve. Through disposing curved steps on the back frame with curvature fitting the curvature of the curved liquid crystal display device to support the other components of the curved liquid crystal display device, the present invention simplifies the structure of the back frame as well as reduces manufacturing cost.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A backlight module of curved liquid crystal display device, which comprises:
   a light-guiding plate, having an upper curved surface, a lower curved surface, a first side surface and a second side surface, wherein the upper curved surface and the lower curved surface being connected to the first side surface and the second side surface at both ends respectively;
   a first light source unit, fixedly disposed near the first side surface; and
   a back frame, having a back plate comprising a plurality of steps, wherein the step surface of each of the steps is contacted to the lower curved surface to support the lower curved surface, and a selected one of the steps is directly coupled to at least one of the steps neighbored to the selected step,
   wherein a part of the step surface of each of the steps contacts to the lower curved surface, and another part of the step surface of each of the steps does not contact to the lower curved surface,
   wherein the part of the step surfaces of two neighbored steps are disconnected with each other,
   wherein the plurality of the step surfaces is arrange at different heights forming a curvature conforming to the same as or similar to the curvature of the lower curved surface; and
   wherein the surface of each of the plurality of steps is parallel to each other.

2. The backlight module as claimed in claim 1, wherein the backlight module further comprises a second light source unit, fixedly disposed near the second side surface.

3. The backlight module as claimed in claim 1, wherein the back plate further comprises a flat plate, wherein the plurality of steps is disposed symmetrically on the two side ends of the flat plate.

4. The backlight module as claimed in claim 3, wherein the back frame further comprises a first side wall and a second side wall, wherein the first side wall and the second side wall are disposed at the two side ends of the back plate respectively, and the first side wall is parallel to the first side surface and the second side wall is parallel to the second side surface.

5. The backlight module as claimed in claim 4, wherein the first light source unit is fixedly disposed on the first side wall so that the first light source unit faces directly the first side surface.

6. The backlight module as claimed in claim 2, wherein the back plate further comprises a flat plate, wherein the plurality of steps is disposed symmetrically on the two side ends of the flat plate.

7. The backlight module as claimed in claim 6, wherein the back frame further comprises a first side wall and a second side wall, wherein the first side wall and the second side wall are disposed at the two side ends of the back plate respectively, and the first side wall is parallel to the first side surface and the second side wall is parallel to the second side surface.

8. The backlight module as claimed in claim 7, wherein the first light source unit is fixedly disposed on the first side wall so that the first light source unit faces directly the first side surface; the second light source unit is fixedly disposed on the second side wall so that the second light source unit faces directly the second side surface.

9. A curved liquid crystal display device, which comprises: a backlight module and a liquid crystal panel disposed opposite to the backlight module; the backlight module providing lighting to the liquid crystal panel so that the liquid crystal panel can display image, wherein the backlight module further comprises:
   a light-guiding plate, having an upper curved surface, a lower curved surface, a first side surface and a second side surface, wherein the upper curved surface and the lower curved surface being connected to the first side surface and the second side surface at both ends respectively;
   a first light source unit, fixedly disposed near the first side surface; and
   a back frame, having a back plate comprising a plurality of steps, wherein the step surface of each of the steps is contacted to the lower curved surface to support the lower curved surface, and a selected one of the steps is directly coupled to at least one of the steps neighbored to the selected step,
   wherein a part of the step surface of each of the steps contacts to the lower curved surface, and another part of the step surface of each of the steps does not contact to the lower curved surface,
   wherein the part of the step surfaces of two neighbored steps are disconnected with each other,
   wherein the plurality of the step surfaces is arrange at different heights forming a curvature conforming to the same as or similar to the curvature of the lower curved surface; and
   wherein the surface of each of the plurality of steps is parallel to each other.

10. The curved liquid crystal display device as claimed in claim 9, wherein the backlight module further comprises a second light source unit, fixedly disposed near the second side surface.

11. The curved liquid crystal display device as claimed in claim 9, wherein the back plate further comprises a flat plate, wherein the plurality of steps is disposed symmetrically on the two side ends of the flat plate.

12. The curved liquid crystal display device as claimed in claim 11, wherein the back frame further comprises a first side wall and a second side wall, wherein the first side wall and the second side wall are disposed at the two side ends of the back plate respectively, and the first side wall is parallel to the first side surface and the second side wall is parallel to the second side surface.

13. The curved liquid crystal display device as claimed in claim 12, wherein the first light source unit is fixedly disposed on the first side wall so that the first light source unit faces directly the first side surface.

14. The curved liquid crystal display device as claimed in claim 10, wherein the back plate further comprises a flat plate, wherein the plurality of steps is disposed symmetrically on the two side ends of the flat plate.

15. The curved liquid crystal display device as claimed in claim 14, wherein the back frame further comprises a first side wall and a second side wall, wherein the first side wall and the second side wall are disposed at the two side ends of the back plate respectively, and the first side wall is parallel to the first side surface and the second side wall is parallel to the second side surface.

16. The curved liquid crystal display device as claimed in claim 15, wherein the first light source unit is fixedly disposed on the first side wall so that the first light source unit faces directly the first side surface; the second light source unit is fixedly disposed on the second side wall so that the second light source unit faces directly the second side surface.

* * * * *